(12) United States Patent
Lloyd

(10) Patent No.: US 8,190,697 B2
(45) Date of Patent: May 29, 2012

(54) AUTOMATED CONFIGURATION OF DEVICE COMMUNICATION SETTINGS

(75) Inventor: Chad A. Lloyd, Old Hickory, TN (US)

(73) Assignee: Square D Company, Palatine, IL (US)

( * ) Notice: Subject to any disclaimer, the term of this patent is extended or adjusted under 35 U.S.C. 154(b) by 569 days.

(21) Appl. No.: 12/468,961

(22) Filed: May 20, 2009

(65) Prior Publication Data

US 2010/0299401 A1 Nov. 25, 2010

(51) Int. Cl.
*G06F 15/16* (2006.01)
(52) U.S. Cl. ........... 709/209; 709/220; 370/335; 725/34
(58) Field of Classification Search .................. 709/220, 709/209; 382/159; 370/335; 725/34
See application file for complete search history.

(56) References Cited

U.S. PATENT DOCUMENTS 6,650,629 B1 * 11/2003 Takahashi et al. ............ 370/335
7,292,723 B2 * 11/2007 Tedesco et al. ............... 382/159
2005/0071867 A1 * 3/2005 Lipsky et al. .................... 725/34

\* cited by examiner

*Primary Examiner* — Tammy Nguyen
(74) *Attorney, Agent, or Firm* — Brinks Hofer Gilson & Lione

(57) ABSTRACT

Automatically configurable master and slave devices in a master/slave multi-drop serial network are disclosed. In one embodiment, the devices and network utilize the Modbus serial communications protocol over a serial multi-drop network, such as an RS-232 or RS-485 (also referred to as EIA-485) based network. Alternatively, the disclosed embodiments may be used with any master/slave serial multi-drop network. In one embodiment, the master and slave devices include pseudo-slave and pseudo-master auto-configuration operating modes, respectively, whereby slave devices which are introduced to the network may send unsolicited identifying messages to the master device which will determine and assign a unique network address thereto, causing the slave device to configure itself to be responsive to messages addressed therewith and then enter its normal slave operating mode to await such messages. The master device, thereafter, maintains a database of the slave devices and their associated network addresses. In one embodiment, legacy slave devices, which do not support the disclosed pseudo-master auto-configuration mode, are supported by the master device which determines when network addresses are in use by such legacy devices, as will be described, and avoids assigning those addresses to newly introduced auto-configurable slave devices.

33 Claims, 7 Drawing Sheets

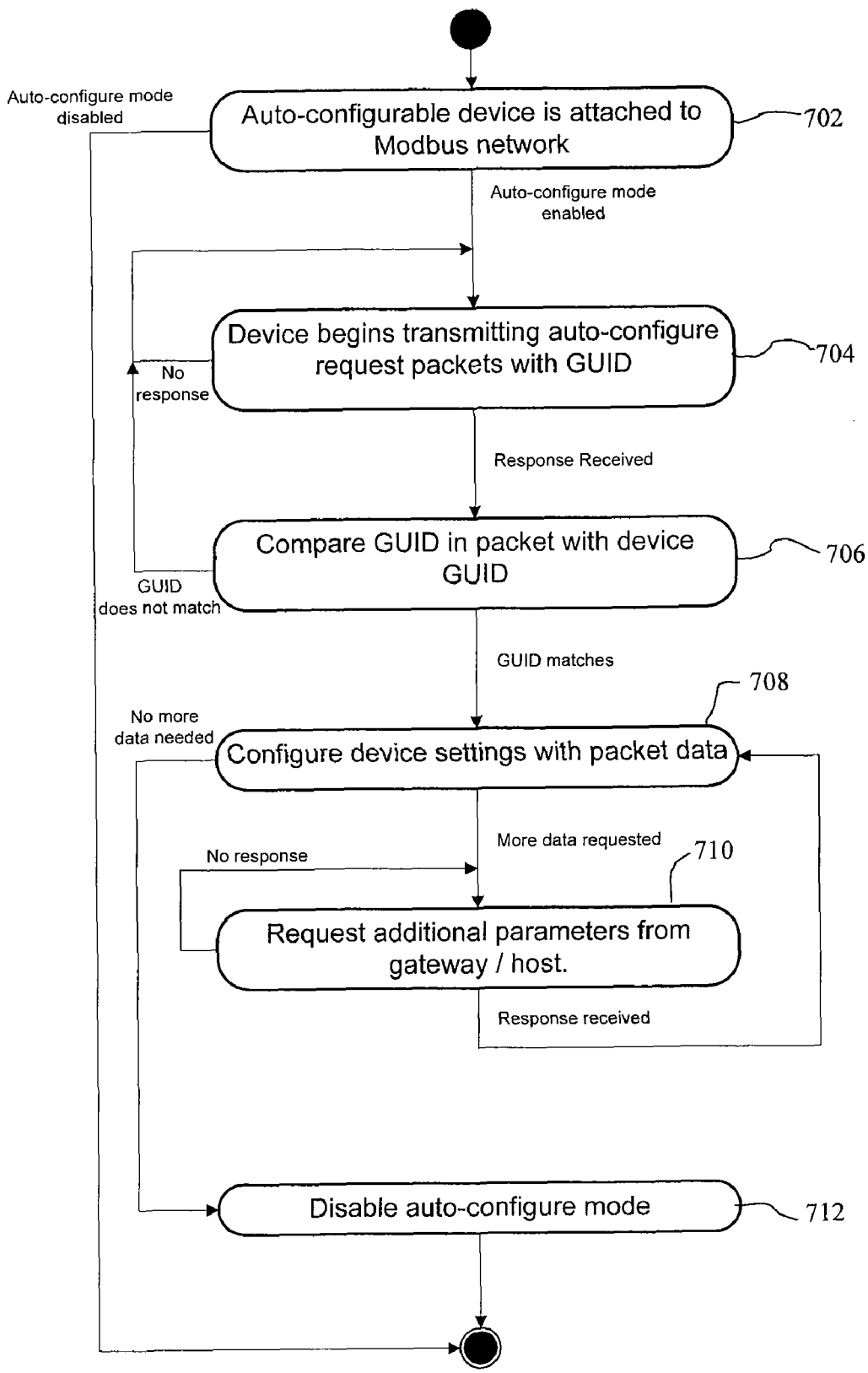
FIG. 7 — State diagram for Auto-configuration (device view)

AUTOMATED CONFIGURATION OF DEVICE COMMUNICATION SETTINGS

BACKGROUND

Modbus is a well known serial communications protocol published by Modicon® in 1979 for use with programmable logic controllers ("PLC"'s) and has become a de facto standard communications protocol in industry. Modbus is now a commonly available means of connecting industrial electronic devices. Modbus allows for communication between many devices connected to the same network, for example a system that measures temperature and humidity and communicates the results to a computer. Modbus is often used to connect a supervisory computer with a remote terminal unit ("RTU") in supervisory control and data acquisition ("SCADA") systems.

Versions of the Modbus protocol exist for serial port and for Ethernet and other networks that support the Internet protocol suite. The most common Modbus variants are Modbus RTU, Modbus ASCII, Modbus Plus and Modbus/TCP. Modbus RTU (binary) and Modbus ASCII are the two basic forms of the Modbus protocol. The ASCII form transmits each 8 bit byte using two ASCII characters from the ASCII character set ('0-9' and 'A-F'). The RTU form transmits all bytes in binary format, i.e. each byte is transmitted as 2 four bit hexadecimal characters. making the protocol faster and more efficient. Both forms may utilize the serial RS-232/RS-485 protocols as the networking medium. Modbus Plus is a Modicon® proprietary protocol used in industrial networking systems. It uses token-passing peer-to-peer communications over a proprietary networking medium at data transfer rates of one megabit per second (high-speed passing of groups of bits within a layer). Typically the network medium is a shielded twisted-pair cable. The structure of Modbus/TCP is similar to the Modbus RTU packet except that it has an extra six-byte header and does not use the cyclic redundancy check ("CRC"). Modbus/TCP defines the packet structure and connection port for the industry standard TCP/IP protocol. Modbus/TCP retains the Modbus RTU limit of 256 bytes to a packet. A protocol variant referred to as Enhanced Modbus/TCP removes this limitation to allow a higher throughput is also utilized.

Most Modbus devices communicate over a serial EIA-485 physical layer using either Modbus RTU or Modbus ASCII. These are often referred to as multi-drop networks as all of the devices on the network are connected to the same wires. The Modbus network, as defined by the protocol, is a single master, multi-drop (more than one device) system that may support up to 247 slave devices.

Each device, intended to communicate using the Modbus protocol over a particular network, is given a unique address unique among the devices connected to the network. In serial and Modbus Plus networks only the node assigned as the master may initiate a command. A Modbus command contains the Modbus address of the device it is intended for. Only the intended device will act on the command, even though other devices might receive it (an exception is specific broadcast-able commands sent to node 0 which are acted upon but may not be acknowledged). The basic Modbus commands can instruct an RTU to change a value in one of its registers, control or read an I/O port, as well as command the device to send back one or more values contained in its registers.

As the serial and Modbus Plus protocols require each device to be configured with a unique address, as a well as other communications parameters, configuring a large Modbus network having numerous slave devices, which may be geographically disperse, is often time consuming and inefficient.

BRIEF DESCRIPTION OF THE DRAWINGS

FIG. 7 depicts a flow chart showing operation of the exemplary slave device of FIG. 5 according to one embodiment.

DETAILED DESCRIPTION

Figure 1A:
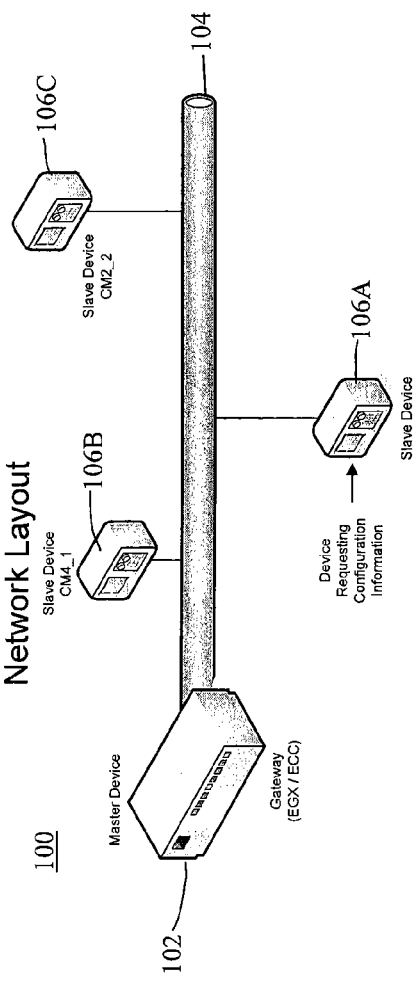
FIG. 1A depicts an exemplary Modbus network for use with the disclosed embodiments.

Automatically configurable master and slave devices for use in a master/slave multi-drop serial network are disclosed. In one embodiment, the devices and network utilize the Modbus serial communications protocol over a serial multi-drop network, such as an RS-232 or RS-485 (also referred to as EIA-485) based network. Alternatively, the disclosed embodiments may be used with any master/slave serial multi-drop network. In one embodiment, the master and slave devices include pseudo-slave and pseudo-master auto-configuration operating modes, respectively, whereby slave devices which are introduced to the network may send unsolicited identifying/configuration request messages to the master device which will determine and assign a unique network address thereto, by responding with a configuration response message, causing the slave device to configure itself to be responsive to messages addressed therewith and then enter its normal slave operating mode to await such messages. The master device, thereafter, maintains a database of the slave devices and their associated network addresses. In one embodiment, legacy slave devices, which do not support the disclosed pseudo-master auto-configuration mode, are supported by the master device which determines when network addresses are in use by such legacy devices, as will be described, and avoids assigning those addresses to newly introduced auto-configurable slave devices.

In particular, by applying networking principles, such as those utilized with the Ethernet based networks, devices on a Modbus network may be configured in an automated fashion. Such configuration of the Modbus device may include the configuration of the Modbus slave address, baud rate, the acquisition of the current transducer ("CT") and voltage transducer ("PT") ratios, the auto-naming of the devices for use by the host software, and/or other parameters or combinations thereof. It will be appreciated that the embodiments described herein may facilitate the application of other networking paradigms to simplify implementation and improve accessibility and reliability. For example, principles, similar to those employed by the Address Resolution Protocol ("ARP"), Dynamic Hosts Configuration Protocol ("DHCP") and the Domain Name System ("DNS"), commonly employed in transport control protocol/internet protocol ("TCP/IP") based networks, may be suitably modified and applied to Modbus devices, as will be described.

As compared with other configuration methodologies, such as brute force methods which repeatedly poll incremental network addresses, or ranges thereof, for unknown devices connected to the network/communications network/network medium looking for a network address for which no response is received, the disclosed embodiments effectively permit newly connected slave devices to identify themselves and request assignment of a network address. In this way, redundant communications traffic over the network medium 104 is reduced, the efficiency with which the network of devices may be configured is improved, and conflicting network address assignments due, for example, to offline or non-responsive devices, are resolved and/or minimized.

The disclosed embodiments will be described with respect to a master device, such as a gateway device, and at least one end device, i.e. slave device. In one embodiment, support for legacy slave devices, e.g. slave devices which are not compatible with the automated configuration protocol of the disclosed embodiments, is provided.

The disclosed embodiments may be used by a system integrator, for example, to install a Supervisory Control and Data Acquisition ("SCADA") system, such as a PowerLogic SCADA system, manufactured by Schneider Electric, Inc. located in Palatine, Ill., in a large data center with many devices. In a typical SCADA system, the configuration of the individual devices would normally take a very long time (baud rate, slave address, etc). Using the automated configuration mechanisms of the disclosed embodiments, the system integrator can substantially accomplish the same installation steps without, for example, touching any front-panel controls of the slave devices.

FIG. 1A shows a typical multi-drop network 100 (simplified), such as a Modbus network 100 for use with the disclosed embodiments. The network includes a master device 102, such as a Modbus gateway, in communication with one or more slave devices 106A, 106B, 106C, which may include circuit monitors, remote terminal units, relays, circuit breakers, industrial controllers, etc., via a network medium 104, such as a RS-485 based Modbus network medium 104. Exemplary Modbus gateway devices which may be used with the disclosed embodiments include the Power Logic Ethernet Gateway and devices incorporating the Power Logic Ethernet Communications Card, both manufactured by Schneider Electric, Inc, located in Palatine, Ill. Other exemplary master devices 102 which may be used with the disclosed embodiments include host systems/servers which support the serial Modbus protocol. For purposes of later examples, slave device 106C is presumed to be a legacy slave device which does not support the automated configuration of the disclosed embodiments. It will be appreciated that the Modbus network 100 may include only slave devices compatible with the disclosed embodiments, only legacy slave devices or any combination thereof. Further, the network 100 may include other slave devices not shown and may use a different network medium 104 other than RS-485, including wired or wireless network media. Herein, the phrases "coupled with" and "in communication with" are defined to mean directly connected to or indirectly connected through one or more intermediate components. Such intermediate components may include both hardware and software based components.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superceding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 1B:
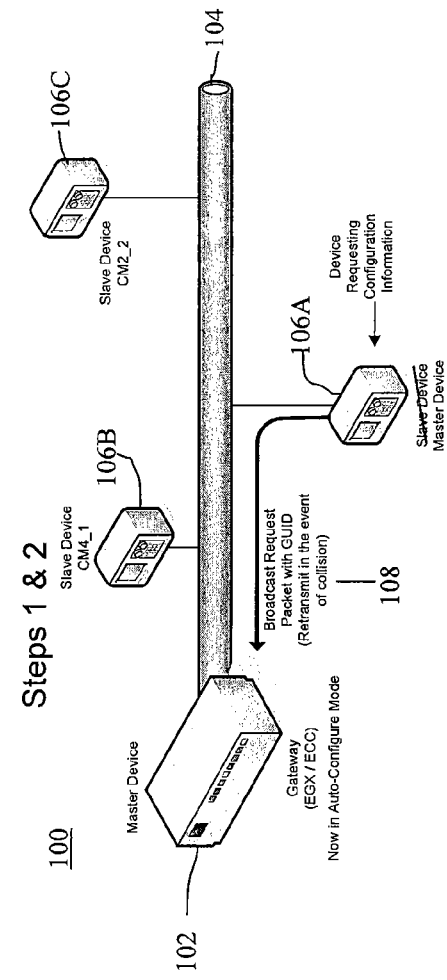
FIG. 1B depicts the exemplary Modbus network of FIG. 1A in an initial operating state of the automated configuration protocol of the disclosed embodiments.

The disclosed embodiments will be described with respect to the set up of a new Modbus network 100 of devices 102, 106A, 106B, 106C via the network medium 104 by a system administrator. Alternatively, the embodiments are also applicable to the introduction of a new master device 102 or slave device 106A, 106B to an existing Modbus network 100, and/or the reconfiguration of an existing Modbus network 100 of devices 102, 106A, 106B, 106C. Generally, as shown in FIG. 1B, the disclosed embodiments operate by placing the master device 102 in a "pseudo-master/slave" mode, referred to also herein as a "pseudo slave mode," which enables the master device 102 to accept broadcast messages from un-configured slave devices 106A, 106B compliant with the automated configuration protocol of the disclosed embodiments, as will be described. While the master device 102 maintains the status of a master, it will also listen for non-requested/unsolicited broadcast packets/messages, referred to as unsolicited configuration request messages, when in the pseudo slave mode. In one embodiment, this provides for security as the master device 102 only listens for these special broadcast messages from slave devices 106A, 106B while in this 'special auto-configure' mode. In one embodiment, the master device 102 will ignore other broadcast messages which are not configuration request messages.

With the master device 102 now in pseudo slave mode, the system administrator then connects a compatible slave device 106A, 106B to the network medium 104. In one embodiment, the slave device 106A, 106B, also referred to as an "end device," is configured to enter into, and operate in, an auto-configuration mode, referred to as a "pseudo master" mode, when power is first applied to it, or it is otherwise turned on and/or connected to the network medium 104. Alternatively, the slave device 106A, 106B may be configured to operate in the pseudo master mode by actuating a control mechanism, such as a switch or register, implemented in either hardware or software, provided locally on the device or remotely thereto via the network medium 104. In the pseudo master mode, the slave device 106A, 106B periodically transmits one or more special 'auto-configure' Modbus broadcast packets, i.e. unsolicited configuration request messages. After transmitting a broadcast packet(s) the slave device 106A, 106B reverts back to a special 'auto-configure' slave mode to await a response from the master device 102 to the transmitted broadcast packet(s). This special slave mode is entered only after an auto-configure broadcast to prevent any injection attack, i.e. the transmission of a malformed broadcast packet transmitted for malicious purposes, or otherwise, which may interfere with network or device operation such as by causing "denial of service" by consuming available network addresses, etc. Further, this mode is timed so that if a response is not received within a defined period of time, e.g. 500 ms, the broadcast is retransmitted and the auto-configure slave mode is re-entered (in the event of data collision, etc) to again await a response. It will be appreciated that the period of time for which the slave device 106A, 106B will wait for a response is implementation dependent. In one embodiment, this pattern continues until the slave device 106A, 106B receives a response, i.e. a properly identified configuration response message, as will be described below. In an alternative embodiment, the slave device 106A, 106B repeats this pattern a limited number of times or over a limited period of time before ceasing such activity and, thereafter, requiring that the device 106A, 106B be again configured to operate in the pseudo master mode for configuration or otherwise reset. It will be appreciated that slave devices 106A, 106B may also provide an alternative manual configuration mode so as, for example, to be compatible with legacy master devices 102 which do not support the automated configuration protocols described herein. In this case, a legacy master device 102 which does not support the described pseudo-slave mode will simply ignore unsolicited configuration request messages from auto-configurable slave devices 106A, 106B.

In one embodiment, the broadcast packet/configuration request message that is sent from the slave device 106A, 106B to the master device 102 includes a global unique identifier ("GUID"), similar to that of a media access control ("MAC") address used by ARP in Ethernet systems. In one embodiment, the GUID is an identifier of the slave device 106A, 106B unique among all auto-configurable slave devices 106A, 106B which may be potentially coupled with the network medium 104, i.e. all manufactured auto-configurable slave devices 106A, 106B. The GUID may be pre-programmed/configured into the slave device 106A, 106B or otherwise derived from various unique properties accessible by firmware on the slave device 106A, 106B, such as serial number, device type, etc., thereby ensuring that it is unique, and is used by the master device 102 to create a lookup table relating the GUID to an assigned network address unique among the devices coupled with the network medium 104, also referred to herein as an ID, slave ID or Modbus slave ID, described in more detail below. A device type identifier may also be provided by the slave device 106A, 106B in the broadcast packet for assistance in ID assignment, such as to allow the master device 102 to strategically assign network addresses as opposed to assigning addresses sequentially to devices as requests are received, e.g. to allow or prevent clustering of network addresses. The network address is selected/intended to be unique among all slave device 106A, 106B, 106C which are coupled with the master device 102 via the network medium 104 but may not necessarily be unique across such networks, e.g. as between two networks each with its own master device. An exemplary broadcast packet is shown in Table 1.

TABLE 1

Broadcast Message from Slave Device

| | | Data | |
|---|---|---|---|
| Destination | Source | GUID | Type |
| Broadcast (0) | N/A | F534A68F434 | CM4000 |

Using principles similar to those used by DHCP and DNS, the master device 102 internally constructs an address table of all connected devices on the network medium 104 based on the received broadcast messages and assigned network addresses. This address table consists of the name of the slave device 106A, 106B, the GUID of the slave device, the network address (slave ID/Modbus address) determined by the master device 102 as will be described below, and (optionally) a lease expiration time. The address table effectively cross references the slave device 106A, 106B, 106C name and/or GUID with the network address of that slave device 106A, 106B, 106C and provides a look-up mechanism to translate the name or GUID into the appropriate network address. The name of the slave device 106A, 106B, 106C may be automatically generated by the master device 102, such as based on the data provided in the broadcast packet, to be a human comprehensible/meaningful reference to the device. Alternatively, the device name may be provided within the broadcast packet or otherwise provided, such as by the system administrator/installer. The lease expiration time may be used to set a time limit on the validity of the network address, the expiration of which forces the master device to re-determine a new network address for the slave device 106A, 106B. Such re-determinations may be limited to those periods when the master device 102 is operating in the pseudo slave mode thereby saving time by not requiring that the master device 102 re-determine all of the network addresses within a short period of time of having already done so. Table 2 shows an exemplary entry in the address table for a slave device 106B, referred to in the Figures as "CM4_1," which, in this example, is an auto-configurable device that has already been assigned a network address (slave ID) of 1.

TABLE 2

Slave Device List

| Name | GUID | Modbus Slave ID | Lease Expiration |
|---|---|---|---|
| CM4_1 | A42367564FD | 1 | 8/23/28 00:23:56 |

In environments where only auto-configurable slave devices 106A, 106B are utilized in conjunction with a compatible master device 102, the master device 102 may simply assign network addresses in sequential order, referring to the address table of assigned addresses to determine the next available network address. It will be appreciated that other algorithms or selection methodologies may be utilized to select the next available network address including methodologies that attempt to assign or avoid assigning consecutive addresses to similar device types, geographically proximate devices, etc. and that such algorithms or selection methodologies are implementation dependent. However, an environment may exist where preconfigured slave devices 106C, e.g. slave devices 106C which have already been configured with a network address, such as legacy slave devices 106C manufactured with a hard coded network address or slave devices 106C which the system administrator has previously configured with a network address, e.g. slave devices 106C incompatible with the disclosed automated configuration protocol, will be connected to the network medium 104 that the master device 102 may not be aware of. Accordingly, after determining the next available network address, such as by reviewing the address table of assigned network addresses, and prior to assigning the next available network address to a requesting auto-configurable slave device 106A, 106B, the master device 102 scans the network medium 104, referred to as "auto-detect", to ensure that the selected network address is available. This may be accomplished by issuing a command over the network medium 104 using the selected network address, directly addressed to the selected network address, and waiting for a response for a period of time, e.g. 5 seconds. If no response is received within an allotted period of time, then the master device determines that the network address is available, it is assigned to the requesting slave device 106A, 106B, and the table is updated.

Figure 2:
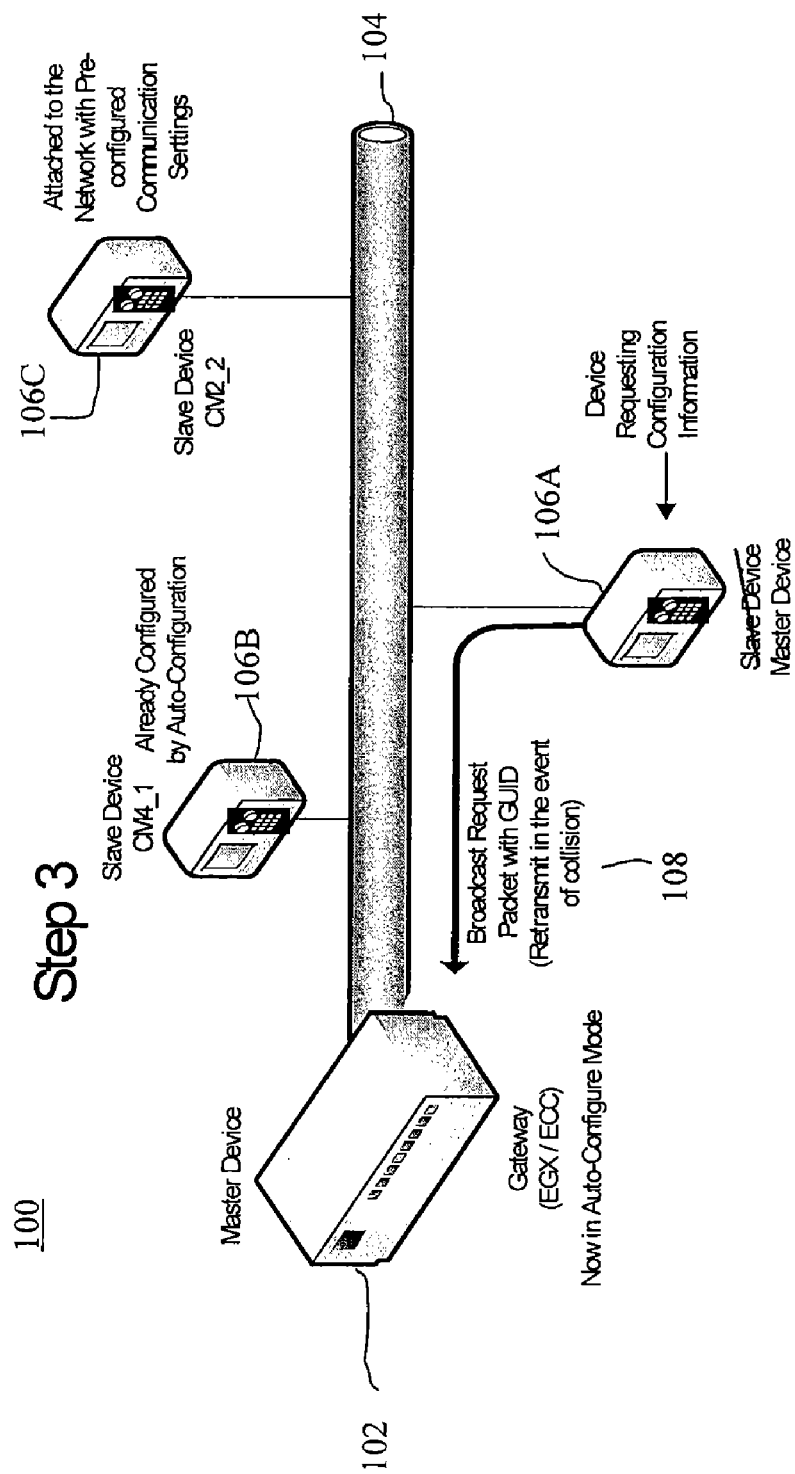
FIG. 2 depicts the exemplary Modbus network of FIG. 1A in an operating state of the automated configuration protocol of the disclosed embodiments subsequent to the operating state depicted in FIG. 1B.
Figure 3:
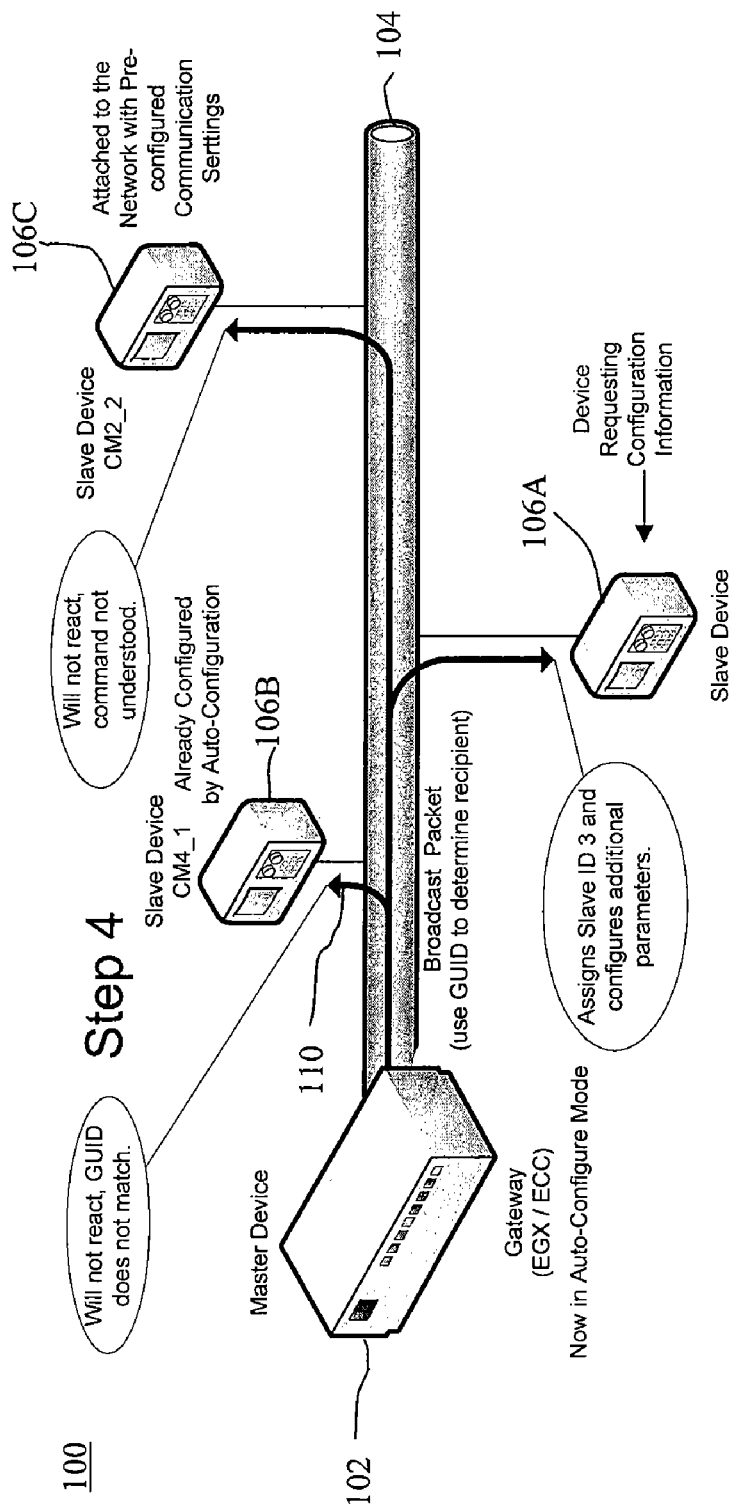
FIG. 3 depicts the exemplary Modbus network of FIG. 1A in an operating state of the automated configuration protocol of the disclosed embodiments subsequent to the operating state depicted in FIG. 2.

However, if after a scan of the network medium 104, as shown in FIG. 2, it is determined that a slave device 106C exists connected to the network medium 104 having the selected network address because, for example, the slave device 106C responded to the command sent by the master device 102, an entry in the address table is created for this slave device 106C associated with the selected network address. This entry acts at least as a place holder to prevent the master device 102 from attempting to again assign the particular network address. As the pre-configured slave device 106C may not have a GUID, this field may be left blank in the address table. An example of such an entry in the address table is shown in Table 3. The master device 102 then selects the next available network address and again determines if that network address is available. In one embodiment, care must also be taken when connecting non-auto-configurable slave devices 106C to the network medium 104 as the network address of the non-configurable slave device 106C may have been previously assigned by the master device 102 to another slave device 106A, 106B. It may be necessary to check the address table in the master device to ensure that the manually configured network address has not already been assigned automatically by the master device 102. In one embodiment, the master device 102 may periodically compare the contents of the address table against a scan of the slave devices 106A, 106B, 106C on the network medium 104 to ensure that there are no conflicts. In one embodiment, if there are no more addresses available, the master device 102 may simply not respond to the requesting slave device 106A. Alternatively, the master device 102 may review the lease expiration timestamps of the present entries in the address table and re-assign any address whose lease on a network address has expired. In this case, the master device 102 may need to first transmit a message to the particular network address to cause any slave device 106A, 106B presently using that network address to stop using it so that it may be reassigned without conflict. In yet another alternative embodiment, the address table may further include a field to record the last successful communication to each network address, i.e. the slave device 106A, 106B connected thereto, wherein network addresses, whose associated last successful communication was beyond a predetermined temporal threshold, are made available for reassignment. It will be appreciated that legacy slave device 106C may be exempted from address reassignment as they may not be capable of ceasing use of their pre-configured network address to permit reassignment thereof. Accordingly, the reassignment mechanisms of the master device 102 may avoid attempting to reassign network addresses denoted in the address table as being assigned to a legacy slave device 106C.

Figure 4:
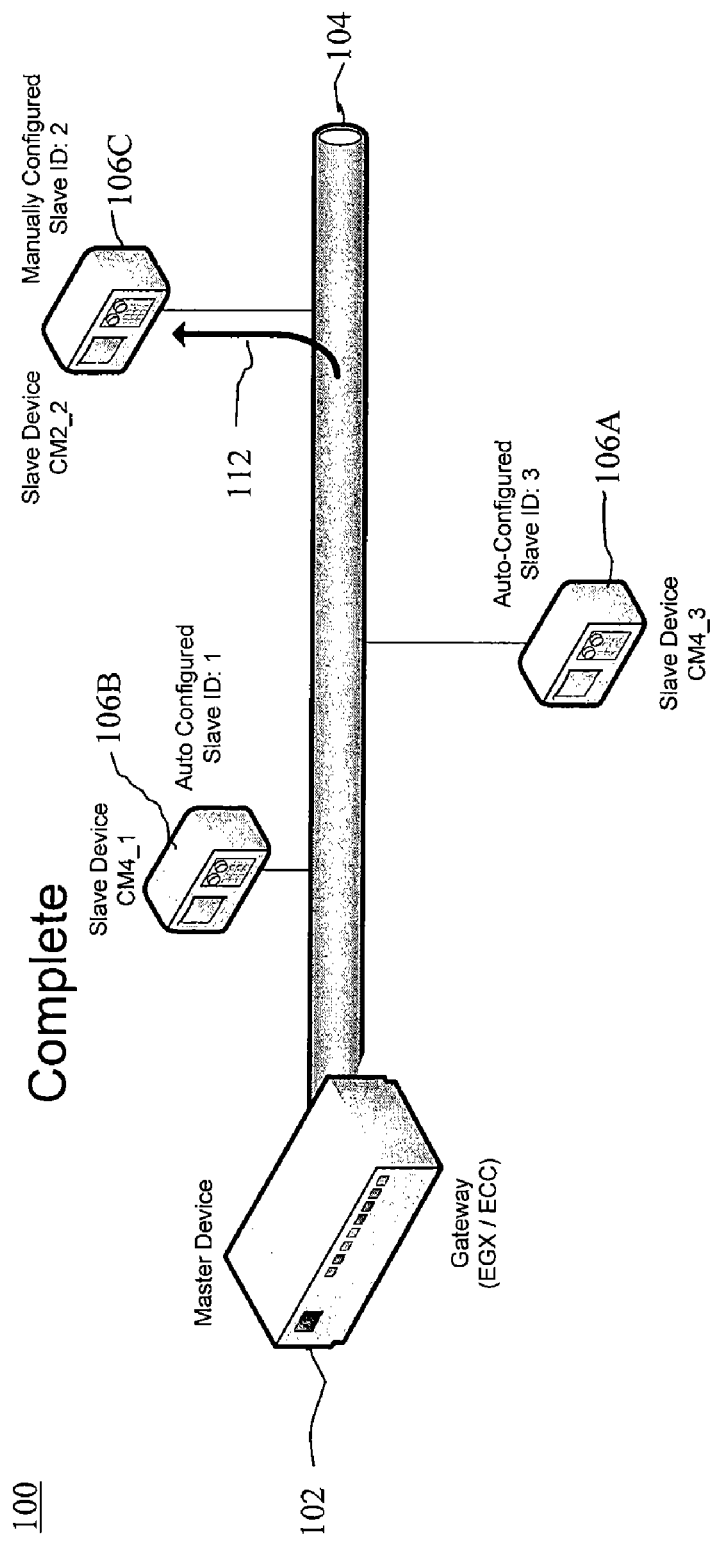
FIG. 4 depicts the exemplary Modbus network of FIG. 1A in an operating state of the automated configuration protocol of the disclosed embodiments subsequent to the operating state depicted in FIG. 3.

Assuming that the next available network address, shown by the address table, is still available after scanning the network medium 104 for confirmation, this network address is assigned to the slave device 106A presently requesting a network address. As shown in FIG. 4 and Table 3, a new address table entry is created containing the name of the requesting slave device 106A, the GUID of the requesting slave device 106A, the assigned network address (slave ID), and (optionally) a lease expiration timestamp.

TABLE 3

End Device List

| Name | GUID | Modbus Slave ID | Lease Expiration |
| --- | --- | --- | --- |
| CM4_1 | A42367564FD | 1 | 8/23/08 00:23:56 |
| CM2_2 | <Static> | 2 | <Static> |
| CM4_3 | F534A68F434 | 3 | 8/23/08 10:22:40 |

As shown by the example depicted in Table 3 and FIGS. 1-4, the received broadcast message indicates that the device type is a CM4000 and the GUID is F534A68F434. These details are entered, by the master device 102, into the address table, naming the device CM4_3, wherein the '3' relates to the assigned network address (Slave ID), and entering the GUID into the correct field. As described above, the name of the slave device 106A 106B, 106C may be automatically assigned or may be assigned by the installer. It will be appreciated that other naming formats or conventions may be used and that an automatically chosen name may be modified or otherwise changed manually.

As the requesting slave device 106A is not yet aware of its assigned network address (slave ID), and therefore would not be responsive to messages addressed therewith, it is necessary to communicate with the slave device 106A through a broadcast message to convey the assigned network address. An exemplary broadcast message is shown in Table 4. This broadcast message contains the GUID of the slave device 106A, allowing the slave device 106A to recognize the message, the network address (slave ID), and optionally, other parameters such as communication parameters (baud rates, etc) and any other parameters (CT/PT ratios, for instance) to make the device as plug-and-play as desired. Note that other slave devices 106B, 106C will ignore the broadcast message as it will not contain a recognizable GUID or, in the case of non-compatible slave devices 106C, will be unrecognizable or otherwise treated as an unsupported command. Once the broadcast message is received by the intended slave device 106A, it will self-configure itself to respond to messages addressed with the assigned network address and then configure itself to operate in the normal slave mode. In one embodiment, the broadcast message may be followed with a direct message to the slave device 106A (via standard Modbus messaging protocols), once the network address (Slave ID) has been established in the slave device 106A, to confirm that the slave device 106A is now properly configured and responsive to messages addressed with the assigned network address. In an alternate embodiment, the slave device 106A may subsequently send a request to the master device 102 for additional configuration parameters which may be necessary to fully configure the slave device 106A for operation. These parameters may be gathered on a per-device basis by the master device 102 from the host software configured via the gateway and forwarded back to the requesting slave device 106A, 106B.

TABLE 4

Broadcast Message from End Device

| | | Data | | |
| --- | --- | --- | --- | --- |
| Destination | Source | GUID | Slave ID | Parameters |
| Broadcast (0) | Master Modbus ID | F534A68F434 | CM4000 | Baud Rate, CT/PT, etc. |

It may be desirable that both the slave devices 106A, 106B and the master device 102 treat the auto-configuration as a one-shot and only allow a re-auto-configuration to occur under close supervision (after a hard reset or administrative approval, for example). This would prevent the possibility that devices coupled with the network medium 104 would get confused.

In an alternative embodiment, a second naming layer may be implemented, permitting the assignment of a human comprehensible identifier to a slave device 106A, 106B, 106C which is cross-referenced by the address table to the assigned network address in a similar fashion as a domain name may be cross referenced to a an IP address per the DNS protocol. Such indirect addressing may be used to allow changes to the assigned network addresses transparent to other devices or software which are communicating with those devices. Once assigned, human operators or operational software may refer to a particular device using the human comprehensible identifier, thereby alleviating the operator/software of having to know or retain the network address of the slave device 106A, 106B, 106C, or otherwise keep up to date with changes thereto.

Figure 5:
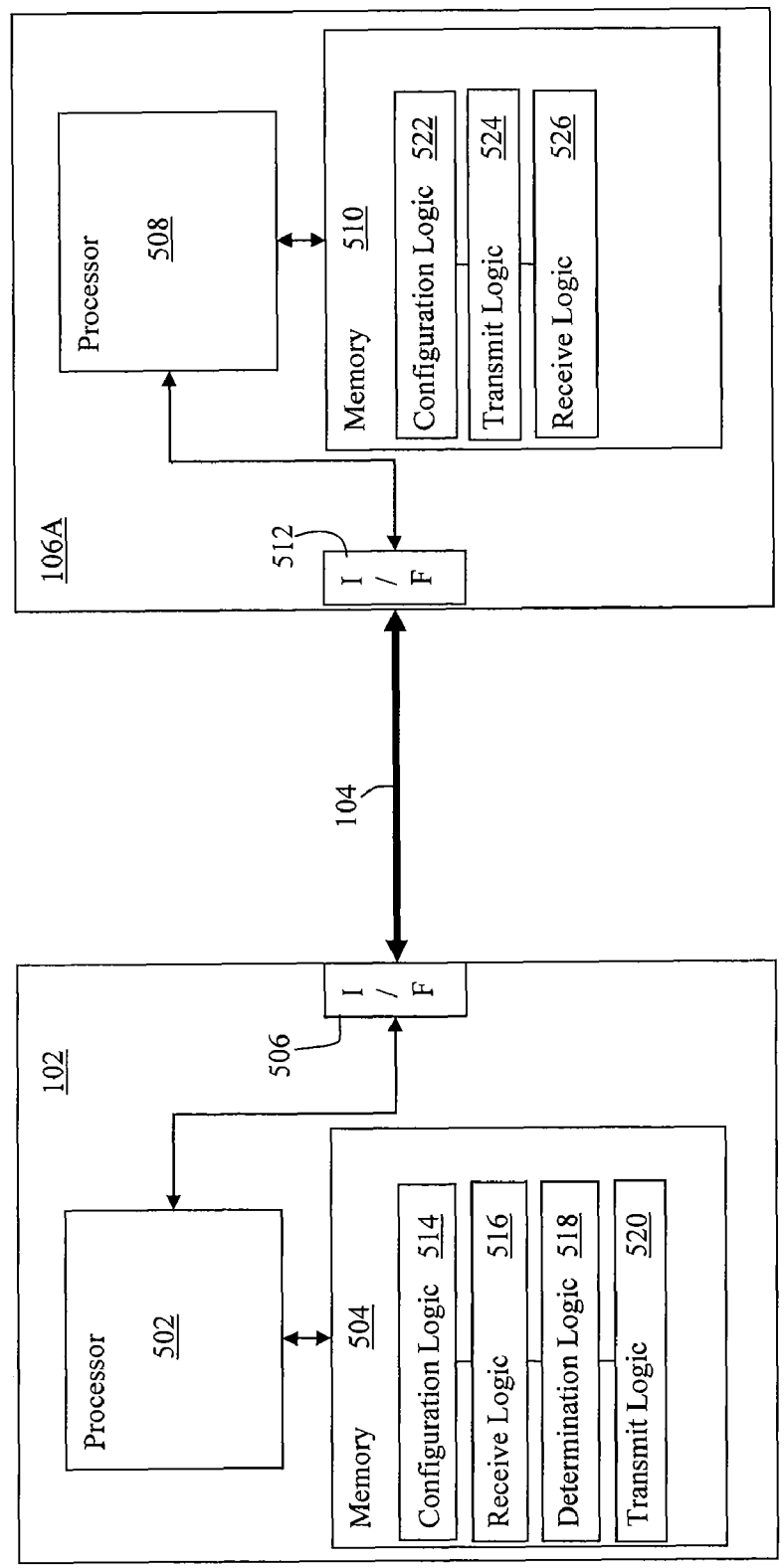
FIG. 5 depicts a block diagram of an exemplary master device and an exemplary slave device for use with the disclosed embodiments.

FIG. 5 depicts a block diagram of an exemplary master device 102 coupled with an exemplary slave device 106A via a network medium 104 for use with the disclosed embodiments.

The master device 102 includes a processor 502, a memory 504 coupled with the processor 502 and a network interface 506 coupled with the processor 502. The network interface 506 is operative to couple the master device 102 with the network medium 104 and may include an RS-485, or other serial protocol, compatible interface. The memory 504, which may include one or more volatile or non-volatile random access memories, read only memories, flash memories or other storage devices or combination thereof, further includes logic, such as configuration logic 514, receive logic 516, determination logic 518 and transmit logic 520, stored in the memory 504 executable by the processor 502 as will be described below. It will be appreciated that the master device 102 may include other components, interfaces and/or other logic stored in the memory 504 and executable by the processor 502, which are not shown and which perform other functions, such as communications, power management or industrial control functions.

The slave device 106A includes a processor 508, a memory 510 coupled with the processor 508 and a network interface 512 coupled with the processor 508. The network interface 512 is operative to couple the slave device 106A with the network medium 104 and may include an RS-485, or other serial protocol, compatible interface. The memory 510, which may include one or more volatile or non-volatile random access memories, read only memories, flash memories or other storage devices or combination thereof, further includes logic, such as configuration logic 522, transmit logic 524 and receive logic 526, stored in the memory 510 executable by the processor 508 as will be described below. It will be appreciated that the slave device 106A may include other components, interfaces and/or other logic stored in the memory 510 and executable by the processor 508, which are not shown and which perform other functions, such as communications, power management or industrial control functions.

The master device 102 is operable to be configured to communicate with the slave device 106A over a network, such as the network medium 104. As described, the network may be a Modbus compatible network and the network medium 104 may be a RS-485 compliant network medium 104 compatible with one or more variants of the Modbus communications protocol. The slave device 106A may be one of a plurality of slave devices 106A, 106B, each of the plurality of slave devices comprising a device unique identifier unique among the plurality of slave devices, referred to as a GUID as described above, pre-programmed/pre-configured or generated, for example, based on the serial number and or other identifying data of the slave device 106A. The slave device 106A is operative in a slave mode, e.g. as a Modbus slave, to transmit a direct communication to the master device 102 only when solicited by the master device 102, the master device 102 operative in a master mode, e.g. a Modbus master, to be otherwise unresponsive to unsolicited direct communications transmitted from the slave device 106A.

In particular, the configuration logic 514 stored in the memory 504 is executable by the processor 502 to configure the master device to operate in a pseudo-slave mode to cause the master device to be responsive to an unsolicited configuration request message, received over the network from any of the plurality of slave devices 106A, 106B, the unsolicited configuration request message comprising the device unique identifier thereof. The receive logic 516 stored in the memory 504, coupled with the configuration logic 514, is executable by the processor 502 to receive an unsolicited configuration request message, via the network interface 506, transmitted over the network 104 by the slave device 106A comprising the device unique identifier of the slave device 106A.

The determination logic 518 stored in the memory 504, coupled with the receive logic 516, is executable by the processor 502 to determine, in response to the receipt of the unsolicited configuration request message, a network unique identifier for the slave device 106A unique among all slave devices 106A, 106B, 106C in communication with the master device 102 over the network 104 and associate the network unique identifier with the received device unique identifier of the slave device 106A. The determination logic is further operative to store, in the memory 504, the network unique identifier in association with the received unique identifier of the slave device 106A, such as in an address table described above, for use when the master device 102 operates in master mode to communicate with the slave device 106A, e.g. under normal operating conditions. As described above, the determination logic 518 may be further operative to first confirm that the network unique identifier is not already in use, e.g. by a pre-configured slave device 106C, such as by first transmitting a communication over the network 104 using the network unique identifier and determining whether a response is received from an existing slave device 106C as was described above.

The transmit logic 520 stored in the memory 504, coupled with the determination logic 518, is executable by the processor 502 to cause the master device 102 to transmit a configuration response message over the network 104 via the network interface 506, the configuration response message comprising the device unique identifier and network unique identifier associated with the device unique identifier of the slave device 106A, the configuration response message being operative to cause the slave device 106A to configure itself to be responsive to messages received from the master device 102 identified by the network unique identifier, i.e. under normal operating conditions.

The slave device 106A is operable to be configured to communicate with the master device 102 over a network, such as the network medium 104. As described, the network may be a Modbus compatible network and the network medium 104 may be a RS-485 compliant network medium 104. The slave device 106A may be one of a plurality of slave devices 106A, 106B, each of the plurality of slave devices 106A, 106B comprising a device unique identifier unique among the plurality of slave devices 106A, 106B, referred to as a GUID as described above, generated, for example, based on the serial number and or other identifying data of the slave device 106A. The slave device 106A is operative in a slave mode, e.g., a Modbus slave, to transmit a direct communication to the master device 102 only when solicited by the master device 102, the master device 102 operative in a master mode, e.g., a Modbus master, to be otherwise unresponsive to unsolicited direct communications transmitted from the slave device 106A.

In particular, the configuration logic 522 stored in the memory 510 is executable by the processor 508 to configure the slave device to be in a pseudo-master mode operative to transmit an unsolicited configuration request message over the network medium 104, the unsolicited configuration request message comprising the device unique identifier of the slave device. The transmit logic 524 stored in the memory 510, coupled with the configuration logic 522, is executable by the processor 508 to cause the slave device to transmit an unsolicited configuration request message over the network medium 104 via the network interface 512, the unsolicited configuration request message comprising the device unique identifier of the slave device 106A.

The receive logic 526 stored in the memory 510, coupled with the transmit logic 524, is executable by the processor 508 to receive a configuration response message, via the network interface 512, comprising the device unique identifier and a network unique identifier associated with the device unique identifier of the slave device 106A, the network unique identifier having been determined to be unique among all slave devices 106A, 106B, 106C in communication with the master device 102 over the network 104. Wherein the configuration logic 522 is further executable by the processor 508 to configure the slave device 106A to be responsive to messages received, via the network interface 512, from the master device 102 identified by the network unique identifier, and, subsequent thereto, configure the slave device 106A to operate in the slave mode. In one embodiment, the network interface 512, receive logic 526 and/or configuration logic 522 may be further operative to first determine whether the device unique identifier contained in the configuration response message matches the device unique identifier of the slave device 106A and, if not, ignore the configuration response message.

In operation, the automated configuration of a master device 102 and a slave device 106A to communicate over a network 104 operates, according to one embodiment, as follows. The slave device 106A, being one of a plurality of slave devices 106A, 106B, each of the plurality of slave devices 106A, 106B comprising a device unique identifier unique among the plurality of slave devices 106A, 106B, is operative in a slave mode to transmit a direct communication to the master device 102 only when solicited by the master device 102 while the master device 102 is operative in a master mode to be otherwise unresponsive to unsolicited direct communications transmitted from the slave device 106A to the master device 102. In one embodiment, the device unique identifier may further identify the type of slave device 106A. In one embodiment, the master device 102 and the plurality of slave devices 106A, 106B, 106C comprises Modbus compatible devices and further wherein the network 104 comprises a Modbus compatible network.

The automated configuration further includes configuring the slave device 106A to operate in a pseudo-master mode, such as by executing the configuration logic 522 described above, operative to transmit an unsolicited configuration request message over the network 104, the unsolicited configuration request message comprising the device unique identifier of the slave device 106A. In one embodiment, the slave device 106A is configured to be in the pseudo-master mode automatically upon applying power to the slave device 106A.

The automated configuration further includes configuring the master device 102 to operate in a pseudo-slave mode, such as by executing the configuration logic 514 described above, operative to be responsive to an unsolicited configuration request message received over the network 104 from any of the plurality of slave devices 106A, 106B, the unsolicited configuration request message comprising the device unique identifier thereof.

Once configured, the slave device 106A transmits an unsolicited configuration request message over the network 104, such as by executing the transmit logic 524 described above, the unsolicited configuration request message comprising the device unique identifier of the slave device 106A. As will be described, the unsolicited configuration request message may be periodically transmitted.

The master device 102 receives the unsolicited configuration request message over the network, such as by executing the receive logic 516 described above. In one embodiment, the unsolicited configuration request message is characterized by an auto-configuration message format wherein the master device 102 operating in the pseudo-slave mode ignores other unsolicited messages which are not characterized by the auto-configuration message format.

In response to receiving the unsolicited configuration request message, the master device 102 determines a network unique identifier for the slave device 106A unique among all slave devices 106A, 106B, 106C in communication with the master device 102 over the network 104 and associates the network unique identifier with the received device unique identifier of the slave device 106A, such as by storing the association in an address table, described above, in the memory 504. In one embodiment, the master device 102 confirms that the selected network identifier is not associated with another slave device 106B, 106C in communication with the master device 102, such as by transmitting a message over the network 104 addressed with the network unique identifier and determining whether or not a response is received. If a response is received, the master device 102 determines that the network unique identifier is being used by another slave device 106B, 106C, and, accordingly, selects another network unique identifier to assign to the slave device 106A, such as by incrementing to the next network unique identifier. Once an unused network unique identifier is determined, the master device 102 may then store the network unique identifier in association with the received unique identifier of the slave device 106A, such as in the memory 504, for use when the master device 102 operates in master mode to communicate with the slave device 106. In one embodiment, if a selected network unique identifier is determined to be already in use by a slave device 106C, the master device 102 may store the used network unique identifier in association with an identifier of the slave device 106C which is using it, thereby maintaining a record of the association.

The master device 102 then transmits a configuration response message over the network 104, the configuration response message comprising the device unique identifier and network unique identifier associated with the device unique identifier of the slave device 106A. The configuration response message may be transmitted as a broadcast message to all slave devices 106A, 106B, 106C as the slave device 106A will not yet have been configured to respond the messages addressed with the network unique identifier. In one embodiment, the configuration response message may include additional configuration parameters, such as communications parameters, e.g. baud rate, CT and/or PT parameters, etc.

The slave device 106A receives the configuration response message over the network 104, the configuration response message comprising the device unique identifier and network unique identifier associated with the device unique identifier of the slave device 106A. The transmission of the configuration response message by the master device 102 may comprise broadcasting the configuration response message to all slave devices 106A, 106B, 106C in communication with the master device, whereby the other slave device 106B, 106C determine whether the device unique identifier contained therein matches the device unique identifier of the other slave device 106B, 106C and, based thereon, ignore the configuration response message by the other slave device 106B, 106C where it does not match.

In one embodiment, the slave device 106A periodically retransmits the unsolicited configuration request message when the configuration response message is not received within a defined period of time.

In response to the receiving of the configuration response message, the slave device 106A configures itself to be responsive to messages received from the master device 102 identified by the network unique identifier, and, responsive thereto, further configures itself to operate in the slave mode. In one embodiment, the configuring, by the slave device 106A in response to the receiving of the configuration response message, further comprises configuring, by the slave device 106A in response to the receiving of the configuration response message, the slave device 106A to be responsive to messages received from the master device 102 identified by the network unique identifier, and, responsive to the configuring, further configuring, automatically, the slave device 106A to be in the slave mode, only if the configuration response message is received subsequent to the transmitting of the unsolicited configuration request message and prior to any retransmitting thereof.

In one embodiment, the slave device 106A may transmit a request for additional configuration parameters to the master device 102 subsequent to receiving and acting in accordance with the configuration response message. In an alternative embodiment, the master device 102 may transmit a direct message to the slave device 106A using the network unique identifier to test that the slave device 106A is properly responsive thereto.

Figure 6:
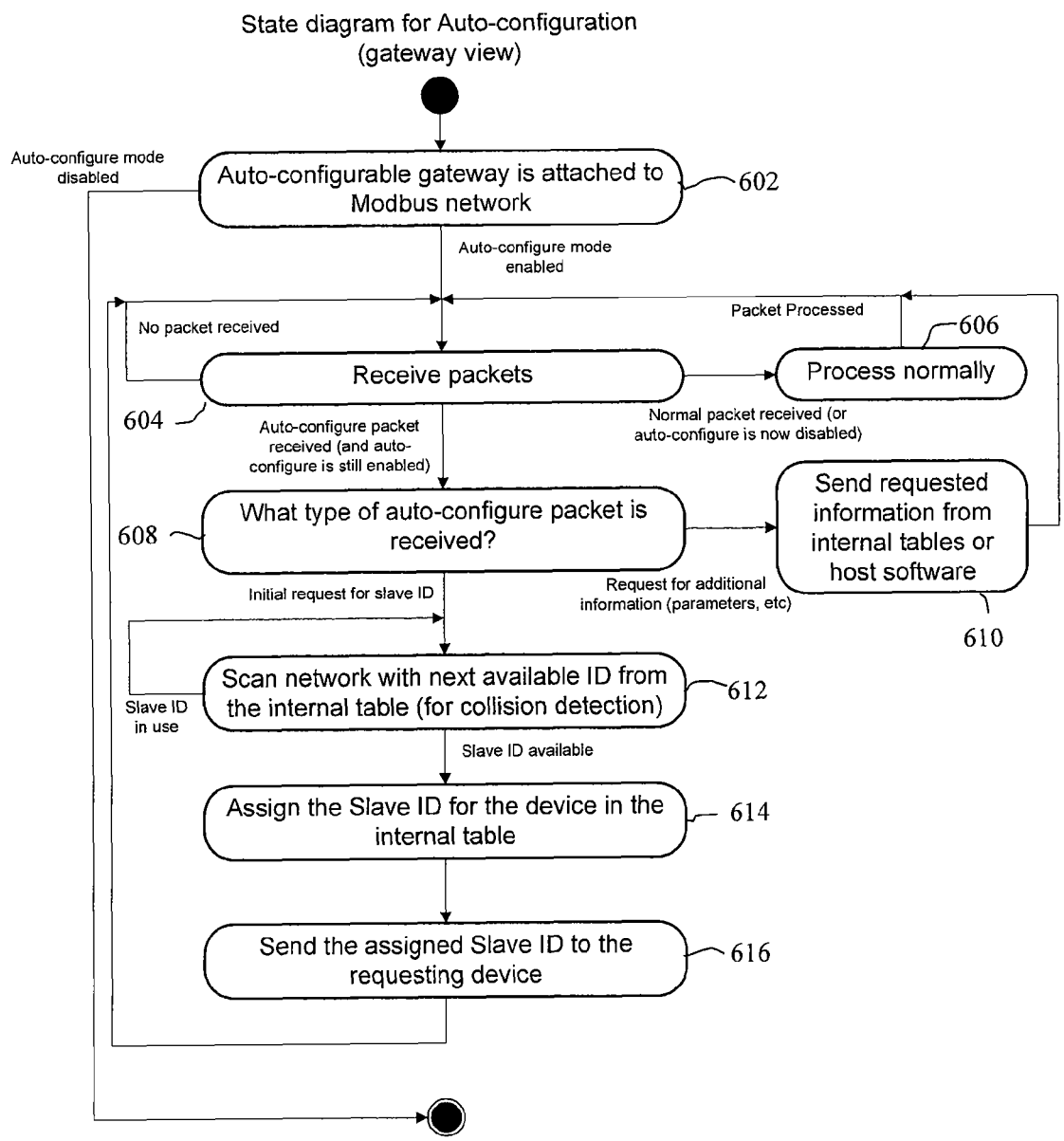
FIG. 6 depicts a flow chart showing operation of the exemplary master device of FIG. 5 according to one embodiment.

In particular, FIG. 6 depicts a flow chart showing operation of the exemplary master device 102, according to one embodiment, to configure a master device 102 to communicate with a slave device 106A over a network 104, the slave device 106A being one of a plurality of slave devices 106A, 106B, each of the plurality of slave devices 106A, 106B comprising a device unique identifier unique among the plurality of slave devices 106A, 106B, the slave device 106A being operative in a slave mode to transmit a direct communication to the master device 102 only when solicited by the master device 102, the master device 102 operative in a master mode to be otherwise unresponsive to unsolicited direct communications transmitted from the slave device 106A. The exemplary operation includes: configuring the master device 102 to operate in a pseudo-slave mode operative to be responsive to an unsolicited configuration request message received over the network 104 from any of the plurality of slave devices 106A, 106B, the unsolicited configuration request message comprising the device unique identifier thereof (block 602); receiving by the master device 102 an unsolicited configuration request message transmitted over the network 104 by the slave device 106A comprising the device unique identifier of the slave device 106A (block 604); determining, in response to the receiving, a network unique identifier for the slave device 106A unique among all slave devices 106A, 106B, 106C in communication with the master device 102 over the network 104 and associating the network unique identifier with the received device unique identifier of the slave device 106A (block 612); storing, by the master device 102, the network unique identifier in association with the received unique identifier of the slave device 106A for use when the master device 102 operates in master mode to communicate with the slave device 106A (block 614); and transmitting a configuration response message over the network 104, the configuration response message comprising the device unique identifier and network unique identifier associated with the device unique identifier of the slave device 106A, the configuration response message being operative to cause the slave device 106A to configure itself to be responsive to messages received from the master device 102 identified by the network unique identifier (block 616).

FIG. 7 depicts a flow chart showing operation of the exemplary slave device, according to one embodiment, to configure a slave device 106A to communicate with a master device 102 over a network 104, the slave device 106A being one of a plurality of slave devices 106A, 106B, each of the plurality of slave devices 106A, 106B comprising a device unique identifier unique among the plurality of slave devices 106A, 106B, the slave device 106A being operative in a slave mode to transmit a direct communication to the master device 102 only when solicited by the master device 102, the master device 102 operative in a master mode to be otherwise unresponsive to unsolicited direct communications transmitted from the slave device 106A. The exemplary operation includes: configuring the slave device 106A to operate in a pseudo-master mode operative to transmit an unsolicited configuration request message over the network 104, the unsolicited configuration request message comprising the device unique identifier of the slave device 106A (block 702); transmitting by the slave device 106A an unsolicited configuration request message over the network 104, the unsolicited configuration request message comprising the device unique identifier of the slave device 106A (block 704); receiving, by the slave device 106A over the network 104, a configuration response message comprising the device unique identifier and a network unique identifier associated with the device unique identifier of the slave device 106A, the network unique identifier having been determined to be unique among all slave devices 106A, 106B, 106C in communication with the master device 102 over the network 104 (block 706); and configuring, by the slave device 106A, the slave device 106A to be responsive to messages received from the master device 102 identified by the network unique identifier, and, responsive to the configuring, further configuring the slave device 106A to operate in the slave mode (block 708).

It is therefore intended that the foregoing detailed description be regarded as illustrative rather than limiting, and that it be understood that it is the following claims, including all equivalents, that are intended to define the spirit and scope of this invention.

I claim:

1. A method of automatically configuring a master device and a slave device to communicate over a network, the slave device being one of a plurality of slave devices, each of the plurality of slave devices comprising a device unique identifier unique among the plurality of slave devices, the slave device being operative in a slave mode to transmit a direct communication to the master device only when solicited by the master device, the master device operative in a master mode to be otherwise unresponsive to unsolicited direct communications transmitted from the slave device to the master device, the method comprising:

configuring the slave device to operate in a pseudo-master mode operative to transmit an unsolicited configuration request message over the network, the unsolicited configuration request message comprising the device unique identifier of the slave device;

configuring the master device to operate in a pseudo-slave mode operative to be responsive to an unsolicited configuration request message received over the network from any of the plurality of slave devices, the unsolicited configuration request message comprising the device unique identifier thereof;

transmitting, by the slave device, an unsolicited configuration request message over the network, the unsolicited configuration request message comprising the device unique identifier of the slave device;

receiving, by the master device, the unsolicited configuration request message over the network;

determining a network unique identifier for the slave device unique among all slave devices in communication with the master device over the network and associating the network unique identifier with the received device unique identifier of the slave device;

storing, by the master device, the network unique identifier in association with the received unique identifier of the slave device for use when the master device operates in master mode to communicate with the slave device;

transmitting a configuration response message over the network, by the master device, the configuration response message comprising the device unique identifier and network unique identifier associated with the device unique identifier of the slave device;

receiving the configuration response message by the slave device over the network, the configuration response message comprising the device unique identifier and network unique identifier associated with the device unique identifier of the slave device; and configuring, by the slave device in response to the receiving of the configuration response message, the slave device to be responsive to messages received from the master device identified by the network unique identifier, and, responsive to the configuring, further configuring the slave device to operate in the slave mode.

2. The method of claim 1 wherein the master and the plurality of slave devices comprises Modbus compatible devices and further wherein the network comprises a Modbus compatible network.

3. The method of claim 1 further comprising:
retransmitting, by the slave device, the unsolicited configuration request message when the configuration response message is not received within a defined period of time.

4. The method of claim 1 wherein the determining further comprises selecting a network identifier and confirming that the selected network identifier is not associated with another slave device in communication with the master device.

5. The method of claim 1 wherein the transmitting of the configuration response message by the master device further comprises broadcasting the configuration response message to all slave devices in communication with the master device, the method further comprising:
receiving, by another slave device of the plurality of slave devices, the configuration response message, determining, by the other slave device, that the device unique identifier contained therein does not match the device unique identifier of the other slave device and, based thereon, ignoring the configuration response message by the other slave device.

6. The method of claim 1 wherein the configuring of the slave device to be in the pseudo-master mode further comprises automatically configuring the slave device to be in the pseudo-master mode upon applying power to the slave device.

7. The method of claim 1 wherein the unsolicited configuration request message is characterized by an auto-configuration message format, the method further comprising ignoring, by the master device operating in the pseudo-slave mode, other unsolicited messages which are not characterized by the auto-configuration message format.

8. The method of claim 1 wherein the configuring, by the slave device in response to the receiving of the configuration response message, further comprises configuring, by the slave device in response to the receiving of the configuration response message, the slave device to be responsive to messages received from the master device identified by the network unique identifier, and, responsive to the configuring, further configuring, automatically, the slave device to be in the slave mode, only if the configuration response message is received subsequent to the transmitting of the unsolicited configuration request message and prior to any retransmitting thereof.

9. The method of claim 1 wherein the device unique identifier further identifies the type of slave device.

10. The method of claim 1 wherein the configuration response message further comprises device configuration parameters.

11. A method of configuring a master device to communicate with a slave device over a network, the slave device being one of a plurality of slave devices, each of the plurality of slave devices comprising a device unique identifier unique among the plurality of slave devices, the slave device being operative in a slave mode to transmit a direct communication to the master device only when solicited by the master device, the master device operative in a master mode to be otherwise unresponsive to unsolicited direct communications transmitted from the slave device, the method comprising:

configuring the master device to operate in a pseudo-slave mode operative to be responsive to an unsolicited message received over the network from any of the plurality of slave devices, the unsolicited message comprising the device unique identifier thereof;

receiving by the master device an unsolicited message transmitted over the network by the slave device comprising the device unique identifier of the slave device;

determining, in response to the receiving, a network unique identifier for the slave device unique among all slave devices in communication with the master device over the network and associating the network unique identifier with the received device unique identifier of the slave device;

storing, by the master device, the network unique identifier in association with the received unique identifier of the slave device for use when the master device operates in master mode to communicate with the slave device; and transmitting a configuration response message over the network, the configuration response message comprising the device unique identifier and network unique identifier associated with the device unique identifier of the slave device, the configuration response message being operative to cause the slave device to configure itself to be responsive to messages received from the master device identified by the network unique identifier.

12. The method of claim 11 wherein the determining further comprises selecting a network identifier and confirming that the selected network identifier is not associated with another slave device in communication with the master device.

13. The method of claim 11 wherein the transmitting of the configuration response message by the master device further comprises broadcasting the configuration response message to all slave devices in communication with the master device.

14. The method of claim 11 wherein the unsolicited configuration request message is characterized by an auto-configuration message format, the method further comprising ignoring, by the master device operating in the pseudo-slave mode, other unsolicited messages which are not characterized by the auto-configuration message format.

15. The method of claim 11 wherein the device unique identifier further identifies the type of slave device.

16. The method of claim 11 wherein the configuration response message further comprises device configuration parameters.

17. A method of configuring a slave device to communicate with a master device over a network, the slave device being one of a plurality of slave devices, each of the plurality of slave devices comprising a device unique identifier unique among the plurality of slave devices, the slave device being operative in a slave mode to transmit a direct communication to the master device only when solicited by the master device, the master device operative in a master mode to be otherwise unresponsive to unsolicited direct communications transmitted from the slave device, the method comprising:
configuring the slave device to operate in a pseudo-master mode operative to transmit an unsolicited message over the network, the unsolicited message comprising the device unique identifier of the slave device;
transmitting by the slave device an unsolicited configuration request message over the network, the unsolicited configuration request message comprising the device unique identifier of the slave device;
receiving, by the slave device over the network, a configuration response message comprising the device unique identifier and a network unique identifier associated with the device unique identifier of the slave device, the network unique identifier having been determined to be unique among all slave devices in communication with the master device over the network;
configuring, by the slave device, the slave device to be responsive to messages received from the master device identified by the network unique identifier, and, responsive to the configuring, further configuring the slave device to operate in the slave mode.

18. The method of claim 17 further comprising:
retransmitting, by the slave device, the unsolicited configuration request message when the configuration response message is not received within a defined period of time.

19. The method of claim 17, the method further comprising:
determining, by the other slave device, that the device unique identifier contained in the configuration response message does not match the device unique identifier of the slave device and, based thereon, ignoring the configuration response message.

20. The method of claim 17 wherein the configuring of the slave device to be in the pseudo-master mode further comprises automatically configuring the slave device to be in the pseudo-master mode upon applying power to the slave device.

21. The method of claim 17 wherein the configuring, by the slave device in response to the receiving of the configuration response message, further comprises configuring, by the slave device in response to the receiving of the configuration response message, the slave device to be responsive to messages received from the master device identified by the network unique identifier, and, responsive to the configuring, further configuring, automatically, the slave device to be in the slave mode, only if the configuration response message is received subsequent to the transmitting of the unsolicited configuration request message and prior to any retransmitting thereof.

22. The method of claim 17 wherein the device unique identifier further identifies the type of slave device.

23. The method of claim 17 wherein the configuration response message further comprises device configuration parameters.

24. A master device operable to be configured to communicate with a slave device over a network, the slave device being one of a plurality of slave devices, each of the plurality of slave devices comprising a device unique identifier unique among the plurality of slave devices, the slave device being operative in a slave mode to transmit a direct communication to the master device only when solicited by the master device, the master device operative in a master mode to be otherwise unresponsive to unsolicited direct communications transmitted from the slave device, the master device comprising a processor, a memory coupled with the processor and a network interface operative to couple processor with the network, the master device further comprising:
configuration logic stored in the memory and executable by the processor to configure the master device to operate in a pseudo-slave mode to cause the master device to be responsive to an unsolicited message received over the network from any of the plurality of slave devices, the unsolicited message comprising the device unique identifier thereof;
receive logic stored in the memory, coupled with the configuration logic, and executable by the processor to receive an unsolicited message, via the network interface, transmitted over the network by the slave device comprising the device unique identifier of the slave device;
determination logic stored in the memory, coupled with the receive logic, and executable by the processor to determine a network unique identifier for the slave device unique among all slave devices in communication with the master device over the network and associate the network unique identifier with the received device unique identifier of the slave device;
the determination logic being further operative to store, in the memory, the network unique identifier in association with the received unique identifier of the slave device for use when the master device operates in master mode to communicate with the slave device; and
transmit logic stored in the memory, coupled with the determination logic, and executable by the processor to cause the master device to transmit a configuration response message over the network via the network interface, the configuration response message comprising the device unique identifier and network unique identifier associated with the device unique identifier of the slave device, the configuration response message being operative to cause the slave device to configure itself to be responsive to messages received from the master device identified by the network unique identifier.

25. The device of claim 24 wherein the determination logic is further executable by the processor to select a network identifier and confirm that the selected network identifier is not associated with another slave device in communication with the master device.

26. The device of claim 24 wherein the transmit logic is further executable by the processor to broadcast the configuration response message to all slave devices in communication with the master device.

27. The device of claim 24 wherein the unsolicited configuration request message is characterized by an auto-configuration message format, the receive logic being further executable by the processor to ignore other unsolicited messages which are not characterized by the auto-configuration message format.

28. A slave device operable to be configured to communicate with a master device over a network, the slave device being one of a plurality of slave devices, each of the plurality of slave devices comprising a device unique identifier unique among the plurality of slave devices, the slave device being operative in a slave mode to transmit a direct communication to the master device only when solicited by the master device, the master device operative in a master mode to be otherwise unresponsive to unsolicited direct communications transmitted from the slave device, the slave device comprising a processor, a memory coupled with the processor and a network interface operative to couple processor with the network, the slave device further comprising:
    configuration logic stored in the memory and executable by the processor to configure the slave device to be in a pseudo-master mode operative to transmit an unsolicited message over the network, the unsolicited message comprising the device unique identifier of the slave device;
    transmit logic stored in the memory, coupled with the configuration logic, and executable by the processor to cause the slave device to transmit an unsolicited configuration request message over the network via the network interface, the unsolicited configuration request message comprising the device unique identifier of the slave device; and
    receive logic stored in the memory, coupled with the transmit logic, and executable by the processor to receive a configuration response message, via the network interface, comprising the device unique identifier and a network unique identifier associated with the device unique identifier of the slave device, the network unique identifier having been determined to be unique among all slave devices in communication with the master device over the network; and
    wherein the configuration logic is further executable by the processor to configure the slave device to be responsive to messages received, via the network interface, from the master device identified by the network unique identifier, and, subsequent thereto, configure the slave device to operate in the slave mode.

29. The device of claim 28 wherein the transmit logic is further executable by the processor to retransmit the unsolicited configuration request message when the configuration response message is not received within a defined period of time.

30. The device of claim 28 wherein the receive logic is further executable by the processor to determine that the device unique identifier contained in the configuration response message does not match the device unique identifier of the slave device and, based thereon, ignore the configuration response message.

31. The device of claim 28 wherein the configuration logic is further executable by the processor to automatically configure the slave device to be in the pseudo-master mode upon an application of power to the slave device.

32. The device of claim 28 wherein the configuration logic is further executable by the processor to configure the slave device to be responsive to messages received from the master device identified by the network unique identifier, and, responsive thereto, further configure, automatically, the slave device to be in the slave mode, only if the configuration response message is received subsequent to the transmission of the unsolicited configuration request message and prior to any retransmission thereof.

33. A method of automatically configuring a master device and a slave device to communicate over a network, the method comprising:
    providing a slave device and a master device, the slave device being one of a plurality of slave devices, each of the plurality of slave devices comprising a device unique identifier unique among the plurality of slave devices, the slave device being operative in a slave mode to transmit a direct communication to the master device only when solicited by the master device, the master device being operative in a master mode to be otherwise unresponsive to unsolicited direct communications transmitted from the slave device to the master device; and
    configuring the slave device to operate in a pseudo-master mode to transmit an unsolicited configuration request to the master device over the network and configuring the master device to operate in a pseudo-slave mode to respond to the unsolicited configuration request message by transmitting a network unique identifier associated with the device unique identifier to the slave device, the slave device being thereafter configured to respond to messages transmitted by the master device identified by the network unique identifier.

* * * * *